April 14, 1936.   S. GUARNASCHELLI   2,037,378
METHOD OF AND MEANS FOR MAKING SPIRALLY CORRUGATED TUBING
Filed Dec. 6, 1933
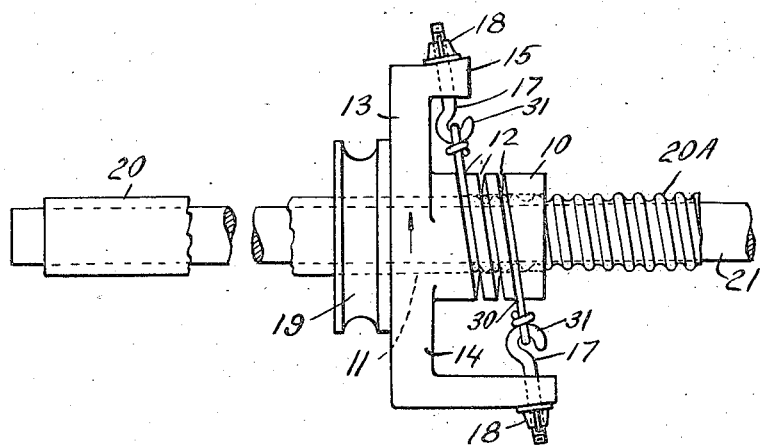
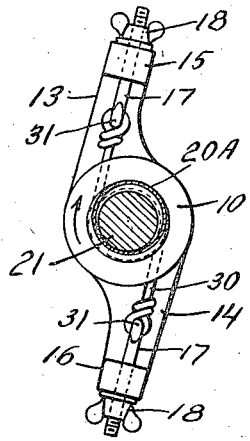
INVENTOR
Stephen Guarnaschelli
BY
Marshall & Hawley
ATTORNEYS Patented Apr. 14, 1936

2,037,378

UNITED STATES PATENT OFFICE 2,037,378

METHOD OF AND MEANS FOR MAKING SPIRALLY CORRUGATED TUBING

Stephen Guarnaschelli, Brooklyn, N. Y., assignor to Packless Metal Products Corporation, New York, N. Y., a corporation of Delaware Application December 6, 1933, Serial No. 701,099

5 Claims. (Cl. 153—71)

This invention relates to improvements in methods of and means for making spirally corrugated tubing.

Its object is to provide a simple method of deforming a cylindrical tube to corrugate helically and to a novel device for making such tubing.

Other objects of the invention will appear from the following specification in which I will describe the invention, the novel features of which will be pointed out in appended claims.

Referring to the drawing,

Fig. 1 is a side elevation of a device which is made according to and embodies this invention, together with a piece of tubing, a part of which is corrugated; and Fig. 2 is an end elevation of the parts which are shown in Fig. 1.

10 designates a cylindrical guide block having a central cylindrical opening 11. 12 is a spiral slot cut through the block. 13 and 14 are arms which extend laterally from the block. These terminate in lugs 15 and 16 which extend over the slot. 19 is a sheave by means of which the block may be rotated.

20 is a piece of cylindrical tubing which extends through the opening 11 in the block. The latter is of a size to permit the block to rotate freely upon the tubing. 21 is a mandrel inserted through the tubing.

30 is a wire the ends of which are looped, as shown at 31. This wire is looped around the tubing 20 through the slot 12 and its ends are engaged by hooks 17 at the end of threaded shanks which pass through the lugs 15 and 16. Wing nuts 18 are provided on these threaded shanks.

The loops 31 at the ends of the wire are engaged by these hooks and the wire is tightened around the tubing by turning the wing nuts 18. A part of the tubing is deformed by the pressure thus exerted upon it by the wire and is drawn down toward the mandrel 21. Now the block 10 is rotated in the direction of the arrow in Fig. 2 which causes the block to travel longitudinally over the tubing 20, or if the block is held against longitudinal movement it causes the tubing 20 to move through it. In this way the corrugations shown at 20A (Fig. 1) are formed in the tubing. The mandrel 21 keeps the tubing straight during this operation. Obviously the maximum depth of the corrugations is limited by the mandrel, although it is not necessary to make them of this maximum depth.

In this simple way and by this simple device tubing may be easily and rapidly corrugated without undue molecular disturbance of its structure. One simple way of looping the wire about the tubing, of maintaining its desired helical position and of applying tension to it has been shown and described for illustrative purposes. It is obvious that other arrangements for accomplishing these results would come within the spirit and scope of the invention and I intend no limitations other than those impended by the following claims.

What I claim is:

1. A device for making corrugated tubing comprising a block having a bore adapted to surround the tubing and constructed with a spiral slot, a wire looped in said slot, and means for tightening the wire.

2. A device for making corrugated tubing comprising a block having a bore adapted to surround the tubing and constructed with a spiral slot, a wire in said slot, means for tightening the wire, and means for rotating the block.

3. A device for making corrugated tubing comprising a block having a bore adapted to surround the tubing and constructed with a spiral slot, a wire looped in said slot, and anchorages for the ends of the wire at least one of which is adjustable.

4. A device for making corrugated tubing comprising a block having a bore adapted to surround the tubing and constructed with a spiral slot, a wire looped in said slot, anchorages for the ends of the wire at least one of which is adjustable, and means for rotating the block and the anchorages.

5. The herein described method of forming permanent spiral corrugations in cylindrical ductile tubing which comprises putting a thin elongated member around the tubing in the form of a short spiral, holding the spiral thus formed at the pitch desired in the finished article, decreasing the diameter of the spiral by pulling the ends of the member which is thus held, and imparting relative rotation between the tubing and member to advance the spiral longitudinally on the tubing.

STEPHEN GUARNASCHELLI.